(12) United States Patent
Bladsjö et al.

(10) Patent No.: US 6,907,030 B1
(45) Date of Patent: Jun. 14, 2005

(54) SYSTEM AND METHOD FOR DECODING MULTIPLEXED, PACKET-BASED SIGNALS IN A TELECOMMUNICATIONS NETWORK

(75) Inventors: David Bladsjö, Stockholm (SE); Arne Berglund, Upplands Väsby (SE); Joakim Sorelius, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 833 days.

(21) Appl. No.: 09/686,734

(22) Filed: Oct. 10, 2000

Related U.S. Application Data
(60) Provisional application No. 60/237,552, filed on Oct. 2, 2000.

(51) Int. Cl.[7] ................................................. H04L 1/00
(52) U.S. Cl. ....................................................... 370/349
(58) Field of Search ................................. 704/211, 215, 704/216, 231, 233; 370/310, 311, 345, 349

(56) References Cited

U.S. PATENT DOCUMENTS

| | | | |
|---|---|---|---|
| 5,835,889 A | 11/1998 | Kapanen | 704/215 |
| 6,477,176 B1 * | 11/2002 | Hamalainen et al. | 370/435 |
| 6,658,064 B1 * | 12/2003 | Rotola-Pukkila et al. | 375/295 |

FOREIGN PATENT DOCUMENTS

| | | |
|---|---|---|
| WO | WO 00/31996 | 6/2000 |

OTHER PUBLICATIONS

European Telecommunications Standards Institute; "Digital Cellular Telecommunication System (Phase 2+); Discontinuous Transmission (DTX) for Adaptive Multi–Rate (AMR) Speech Traffic Channels"; v. 7.30; 1998.

Nokia, 3GPP TSG GERAN; "Multiplexing on Dedicated Physical SubCHannel"; TSGG#01(00)0254; Aug. 28, 2000.

Lucent Technologies, 3GPP TSG GERAN; "Stealing Bit Options for OS2 Multiplexing"; Aug. 28, 2000.

Ericsson, 3GPP TSG GERAN; "Stealing Bits Aspects for GERAN"; GERAN Adhoc 0555/00; Aug. 7, 2000.

Daugan, G., et al., "Three–State Voice Framing", *IBM Technical Disclosure Bulletin*, vol. 27, No. 4B, Sep. 1984.

Bruhn, S., et al., "Continuous and Discontinuous Power Reduced Transmission of Speech Inactivity for the GSM System" IEEE, Nov. 8, 1998.

EPO, Standard Search Report for U.S. Appl. No. 09/686, 734, (RS 106060 US), Jul. 2, 2000.

* cited by examiner

*Primary Examiner*—Chi Pham
*Assistant Examiner*—Derrick W Ferris

(57) ABSTRACT

A method and system are disclosed for communication within a TDMA based system. The system may include one or more receivers, each receiver being configurable in a plurality of states, wherein in each state the physical layer headers associated with received frames of information are used to determine the format in which the received frames of information are to be decoded.

15 Claims, 3 Drawing Sheets

| SPEECH | | | DTX | | |
|---|---|---|---|---|---|
| DESCRIPTION | NAME | PATTERN | DESCRIPTION | NAME | PATTERN |
| SPEECH | DSB0 | 00000000 | SPEECH | BSB0 | 0000 0000 |
| FACCH | DSB1 | 11111111 | MCS 1-4 | BSB1 | |
| | | | PACCH | BSB2 | |

SYSTEM AND METHOD FOR DECODING MULTIPLEXED, PACKET-BASED SIGNALS IN A TELECOMMUNICATIONS NETWORK

REFERENCE TO EARLIER FILED PROVISIONAL APPLICATIONS

This patent application claims the benefit of priority from, and incorporates by reference the entire disclosure of, co-pending U.S. Provisional Patent Application Ser. No. 60/237,552 filed on Oct. 2, 2000, entitled "System and Method for Decoding Multiplexed, Packet-Based Signals in a Telecommunications Network."

BACKGROUND OF THE INVENTION

1. Technical Field of the Invention

The present invention relates to decoding transmitted signals, and particularly to decoding transmitted signals based upon the state of the corresponding physical layer headers.

2. Description of the Related Art

With the introduction of new services or applications over packet data systems in a mobile communication network, for example, real time (RT) services such as VoIP, there will be a large variety of quality of service (QoS) demands on the network. Certain users, for example, those utilizing real time voice applications will have a very high demand for the availability of transmission resources, whereas users, for example, who transmit short messages or electronic mail, will be satisfied with a lower availability of transmission resources.

For example, in the well known Universal Mobile Telecommunications System (UMTS), there are four proposed QoS classes: the conversational class; streaming class; interactive class; and background class. The main distinguishing factor between these classes is the sensitivity to traffic delay. Conversational class traffic is intended for traffic which is very delay sensitive while background class traffic is the most delay insensitive traffic class. Conversational and streaming classes are intended to be used to carry RT traffic flows and interactive and background classes are intended to be used to carry Internet applications (e.g., www, e-mail, telnet, FTP, etc.).

Real time services include sensitive time constraints over a reserved access channel. That is, delays in the transmission and/or reception of successive packets can have noticeable and undesirable QoS effects (e.g., on voice quality). These time constraints can be handled by always reserving access time at predetermined intervals during a communication with high QoS demands. In this way, a real time service communication can proceed uninterrupted since it will be allocated communication resources regardless of whether or not any packets will be sent. That is, for example, silent periods will occur in a real time voice communication, and in order to conserve battery resources, the silent periods need not be transmitted, or the transmission power can be considerably reduced.

Silent periods can be detected in a voice activity detector (VAD) device. During silent periods, a silence descriptor (SID) signal is sent to the receiver. The receiver generates comfort noise in order to closely mimic the naturally occurring background noise so that the receiving user perceives that the communication path between the transmitter and the receiver is still open and operable. In addition to the SID, an indication is sent to the transmitter that there is no voice activity detected and the transmitter can reduce its transmitter output power or set it to zero for that connection. This technique is called discontinuous transmission (DTX). With DTX enabled, interference is decreased in the system, since transmitters will only emit output power when there is information to be transmitted (e.g., when voice activity is detected or when SIDs are transmitted).

Resources are allocated for the real time services users regardless of whether or not packets are sent from the transmitter. However, it would be advantageous if these silent periods could be used in a more efficient way by allowing other applications to use the allocated resources during the silent periods without lowering the QoS of real time service.

In connection with the development of third generation mobile communication systems, new wireless multimedia and data applications are being designed and introduced. To support these new applications, improved data transmission technologies are also being developed. One such technology is Enhanced Data rates for Global Evolution (EDGE), which uses a more efficient radio-modulation technology that is optimized for data communications and that can be implemented on existing GSM and IS-136 systems. When used in connection with General Packet Radio Service (GPRS), a packet-switched technology that delivers speeds of up to 115 kilobits per second (kbit/s), EDGE technology can increase end user data rates up to 384 kbit/s, and potentially higher in high quality radio environments.

In connection with the development of EDGE and other technologies for supporting higher data rates, a number of techniques for multiplexing different users on the same set of resources have been developed. For example, in the packet-switched mode of EDGE technology (i.e., Enhanced GPRS (EGPRS)), the capability exists to multiplex different users on the same time slot. In this mode, packet data is transferred via a wireless communication link using 20 millisecond (ms) radio blocks. Each radio block is transferred to or from a particular user as a sequence of four consecutive bursts on a time slot that is assigned to the user. Subsequently, the time slot can be assigned to another user for the transmission of four bursts to or from that other user or can be again assigned to the same user for the transmission of an additional four bursts.

When transmitting information having different formats on the same channel, a receiver needs to know the current format of a transmitted signal frame in order to perform successful decoding of the information therein. For instance, the physical layer headers and/or stealing bits associated with signals transmitted in GSM systems inform the receiver whether transmitted information is speech or the fast associated control channel (FACCH). In a GSM/EDGE Radio Access Network (GERAN), however, information other than speech and FACCH may be transmitted. This is possible because many voice coders, such as the Adaptive Multi-Rate (AMR) coder, utilize DTX, and the silence periods can then be used to transmit best effort data (such as interactive and background classes).

Within the receiving side of an AMR communications link, there resides a receiver DTX handler. The receiver DTX handler indicates to the speech decoder whether received signals are speech or comfort noise. The receiver DTX handler transitions, between two possible states. In a first state, the SPEECH state, the receiver DTX handler is configured to deliver speech signals to the AMR vocoder. During a speech silence period the receiver DTX handler enters a second state, the COMFORT_NOISE state, and generates comfort noise as is known in the art. The receiver DTX handler searches for various AMR identification markers, such as SID_FIRST (which marks the beginning of a DTX period) and SID_UPDATE, the reception of which causes the receiver to transition to the COMFORT_NOISE state from the SPEECH state. When a speech frame is correctly decoded, the start of a talk spurt is implicitly indicated and the receiver DTX handler transitions to the SPEECH state where comfort noise generation is suspended.

More recent GERAN systems require the capability to decode additional formats at the receiver during speech silence periods. In addition to speech and FACCH, additional formats include the Packet Associated Control Channel (PACCH) and various types of data, such as Modulation & Coding Schemes (MCS) 1–9. Prior attempts to handle additional formats and/or the capability of decoding additional formats include extending the length of the physical layer header in order to accommodate a greater number of different format indications therein. This approach, however, increases overhead which in turn decreases communication performance. This is especially critical when transmitting overhead-sensitive information, such as speech information. Further, changing the size of the physical layer header may lead to changing existing header coding assignments, thereby undesirably resulting in changing standardization, implementation and verification.

Another prior attempt to handle additional information formats include letting the receiver be state dependent, and having the receiver to perform an exhaustive search for the correct format among the ones allowed in each state. In this approach, the receiver decodes the format and uses CRC to verify the successfully decoded format. The approach, however, results in a substantial increase in decoding complexity since the receiver's decoder is potentially forced to decode each block of information several times before proceeding.

What is needed, then, is a receiver that is capable of efficiently and effectively handling transmitted speech and other information.

SUMMARY OF THE INVENTION

Embodiments of the present invention overcome shortcomings in prior systems and satisfy a significant need for a receiver for a telecommunications network that is capable of receiving information in any of a variety of formats without increasing overhead or otherwise adversely impacting the transmission of information. In accordance with an embodiment of the present invention, the receiver is state dependent and configurable to interpret the physical layer header differently depending upon the present state of the receiver based upon the AMR identification markers associated with the received signal. In other words, the physical layer headers are capable of representing a group of signal formats which varies depending upon the state or mode in which the receiver is configured.

The receiver is therefore suited for handling multiplexed information including higher and lower priority information. For example, the receiver may be used in a GERAN system for handling multiplexed speech (i.e., higher priority information) and best effort data (i.e., lower priority information). In this context, the receiver is configurable in a SPEECH mode to receive and decode either speech or FACCH information. During the SPEECH mode, the speech/FACCH information and the physical layer header is diagonal interleaved. The physical layer header indicates to the receiver whether speech or FACCH decoding is to be used. The receiver is configured into a NO_SPEECH mode upon the occurrence of an AMR identification marker indicating the start of a DTX or silent period. When in the NO_SPEECH mode, the transmitted information frames and the physical layer header are received by the receiver as block interleaved signals so as to allow for modulation changes of best effort data without interleaving loss. If the physical layer header indicates that the corresponding transmitted information frame is best effort data or PACCH, the receiver decodes the information accordingly, generates a comfort noise level and remains in the NO_SPEECH mode. If the physical layer header or an AMR identification marker indicates that the transmitted information is speech, the receiver enters a third or SPEECH_POSSIBLE mode. When in the SPEECH_POSSIBLE mode, the receiver once again treats the transmitted information frames and the physical layer headers as diagonal interleaved signals while continuing to provide comfort noise. Following the correct decoding of the speech frames, the receiver transitions to the SPEECH mode. Alternatively, if the speech frame(s) is not correctly decoded or if no speech frames are transmitted, the receiver returns to the NO_SPEECH mode.

By transitioning between the modes in this way, the receiver advantageously performs decoding and other operations based upon the present state of the receiver. This allows the receiver to be able to communicate best effort data during speech silence periods having any of a plurality of various signal formats. In addition, the receiver is capable of correcting the incorrect decoding of transmitted frames in part by transitioning from the NO_SPEECH mode to the SPEECH mode without having detected an AMR identification marker, such as ONSET at the beginning of a talk spurt. This correction allows the receiver to correctly decode transmitted information even if AMR identification markers indicating a change in transmitted information is not detected by the receiver, thereby improving signal reception performance.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE EXEMPLARY EMBODIMENTS

The present invention will now be described more fully hereinafter with reference to the accompanying drawings in which an embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

In general terms, embodiments of the present invention are directed to communicating multiplexed information having any of a variety of signal formats. In order for a receiver involved in the communicating to distinguish between the different signal formats so that the receiver may suitably decode a received signal, a code associated with signals received by the receiver, such as the physical layer header, is used by the receiver.

The multiplexed information may, for example, include higher and lower priority information. A receiver involved in the communication is configurable into any of a plurality of states, with individual states corresponding to receiving information having a particular priority level. For instance, the receiver may be configured in a first state for decoding higher priority information, and a second state for decoding lower priority information. According to embodiments of the present invention, the physical layer header is used by the receiver in each state to determine the particular signal format of the corresponding received signal for decoding same. The higher priority information may thus be of any of a group of signal types that is different from the group of signal types of the lower priority information, so that the receiver interprets the physical layer headers differently for each state of the receiver. Receiver state transitions are triggered by, for example, AMR identification markers received by the receiver.

For exemplary purposes, an embodiment of the present invention will be described within the context of communication in a GERAN system, wherein speech and best effort data are multiplexed together.

Figure 1:
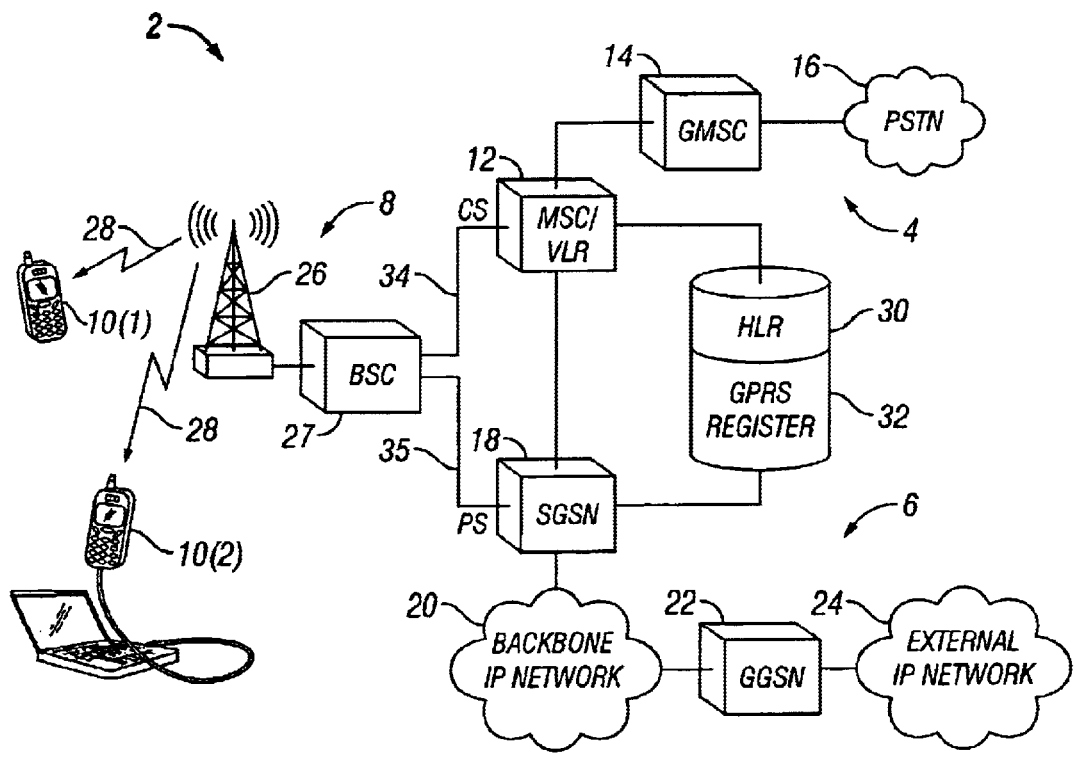
FIG. 1 is a block diagram of a mobile telecommunications system in which a receiver according to the present invention may be implemented.

Reference is now made to the drawings wherein like reference characters denote like or similar parts throughout the various Figures. Referring now to FIG. 1, there is illustrated a block diagram of a mobile telecommunications system 2 in which the present invention can be implemented. In particular, the system 2 depicted in the Figure is a time division multiple access (TDMA) system, which operates according to GSM standards. Although the invention is illustrated and described in connection with a TDMA system, it will be recognized by those skilled in the art that the invention is also applicable in other types of telecommunications systems, such as CDMA. In addition, the system supports EGPRS technology. The mobile telecommunications system 2 includes a circuit-switched network 4, a packet-switched network 6, and a radio network that is shared by the circuit-switched and packet-switched networks 4 and 6. Generally, the circuit-switched network 4 is primarily used for voice applications, while the packet-switched network 6 is primarily used for data applications. In accordance with third generation mobile telecommunications standards, however, the circuit-switched network 4 can also support data communications, and the packet-switched network 6 can also support voice communications. An embodiment of the present invention will be described for exemplary purposes for use in a GERAN system and particularly to a receiver for handling multiplexed speech and best effort data. It is understood, however, that embodiments of the present invention may be directed to handling other higher/lower priority communications.

The circuit-switched network 4 includes a number of mobile switching center/visitor location registers (MSC/VLRs) 12. For purposes of simplifying the illustration, however, only one MSC/VLR 12 is shown. Each MSC/VLR 12 serves a particular geographic region and is used for controlling communications in the served region and for routing communications to other MSC/VLRs 12. The VLR portion of the MSC/VLR 12 stores subscriber information relating to mobile stations 10 that are currently located in the served region. The circuit-switched network 4 further includes at least one gateway mobile switching center (GMSC) 14 that serves to interconnect the circuit-switched network 4 with external networks, such as a public switched telephone network (PSTN) 16.

The packet-switched network 6 includes a number of serving GPRS support nodes (SGSN) 18, which are used for routing and controlling packet data communications, and a backbone IP network 20. A gateway GPRS support node (GGSN) 22 interconnects the packet-switched network 6 with an external IP network 24 or other external data networks.

The radio network 8 includes a plurality of cells. Each cell in the mobile telecommunications system 2 is served by a base station 26 that communicates with mobile stations 10 in the cell via an air interface 28. As is currently being planned for future TDMA systems integrated with a packet-switched GPRS network, a base station controller (BSC) 27 will control a plurality of base stations 26 (as in existing GSM systems). For circuit-switched communications, signals are routed from the MSC/VLR 12, to the BSC 27 via a circuit switched (CS) interface 34, to the base station 26 for the cell in which the target mobile station 10 is currently located, and over the air interface 28 to the mobile station 10. For packet data transmissions, on the other hand, signals are routed from the SGSN 18, to the base station controller 27 via a packet switched (PS) interface 35, to the base station 26 for the cell in which the target mobile station 10 is currently located, and over the air interface 28 to the mobile station 10.

Each mobile station 10 is associated with a home location register (HLR) 30. The HLR 30 stores subscriber data for the mobile station 10 that is used in connection with circuit-switched communications and can be accessed by the MSC/VLRs 12 to retrieve subscriber data relating to circuit-switched services. Each mobile station 10 is also associated with a GPRS register 32. The GPRS register 32 stores subscriber data for the mobile station 10 that is used in connection with packet-switched communications and can be accessed by the SGSNs 18 to retrieve subscriber data relating to packet-switched services.

In an embodiment of the present invention, telecommunication system 2 utilizes a discontinuous transmission (DTX) technique during which a mobile station temporarily discontinues communication of real time information. In particular, telecommunication system 2 provides for the transmission of a first silence descriptor (SID) message by a transmitter to a receiver, on either the uplink or the downlink, to notify the receiver of the beginning of a silent period. The SID message indicates the type or level of noise to be generated at the receiver so that the receiver closely mimics naturally occurring background noise. In this way, a user at the receiver does not perceive a break in communication with the transmitter. SID messages are updated periodically during a silent DTX period by the transmitter sending new SID messages according to a predetermined schedule. DTX techniques are known in the art.

The disclosed embodiment of the present invention is directed to communication of information within a GSM/EDGE 451 Radio Access Network (GERAN), and particularly to transmitting and receiving information therein having any of a variety of formats. The embodiment of the present invention concerns the use and/or decoding of information including FR (full rate) GMSK modulated speech, but it is understood that the embodiment of the present invention may be suitable for HR (half rate) 8-PSK modulated speech and/or other speech types as well.

Figure 2:
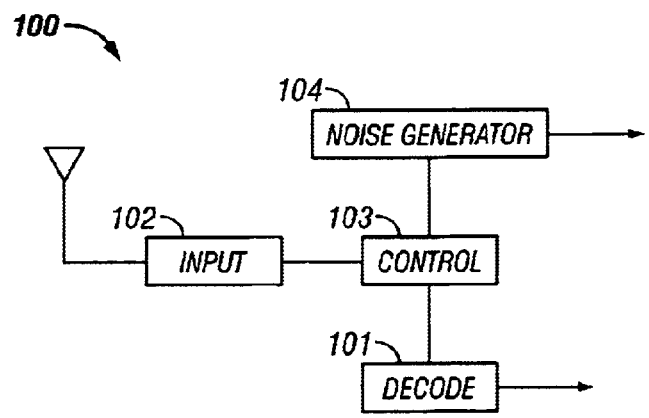
FIG. 2 is a block diagram of the receiver according to an embodiment of the present invention.
Figure 3:
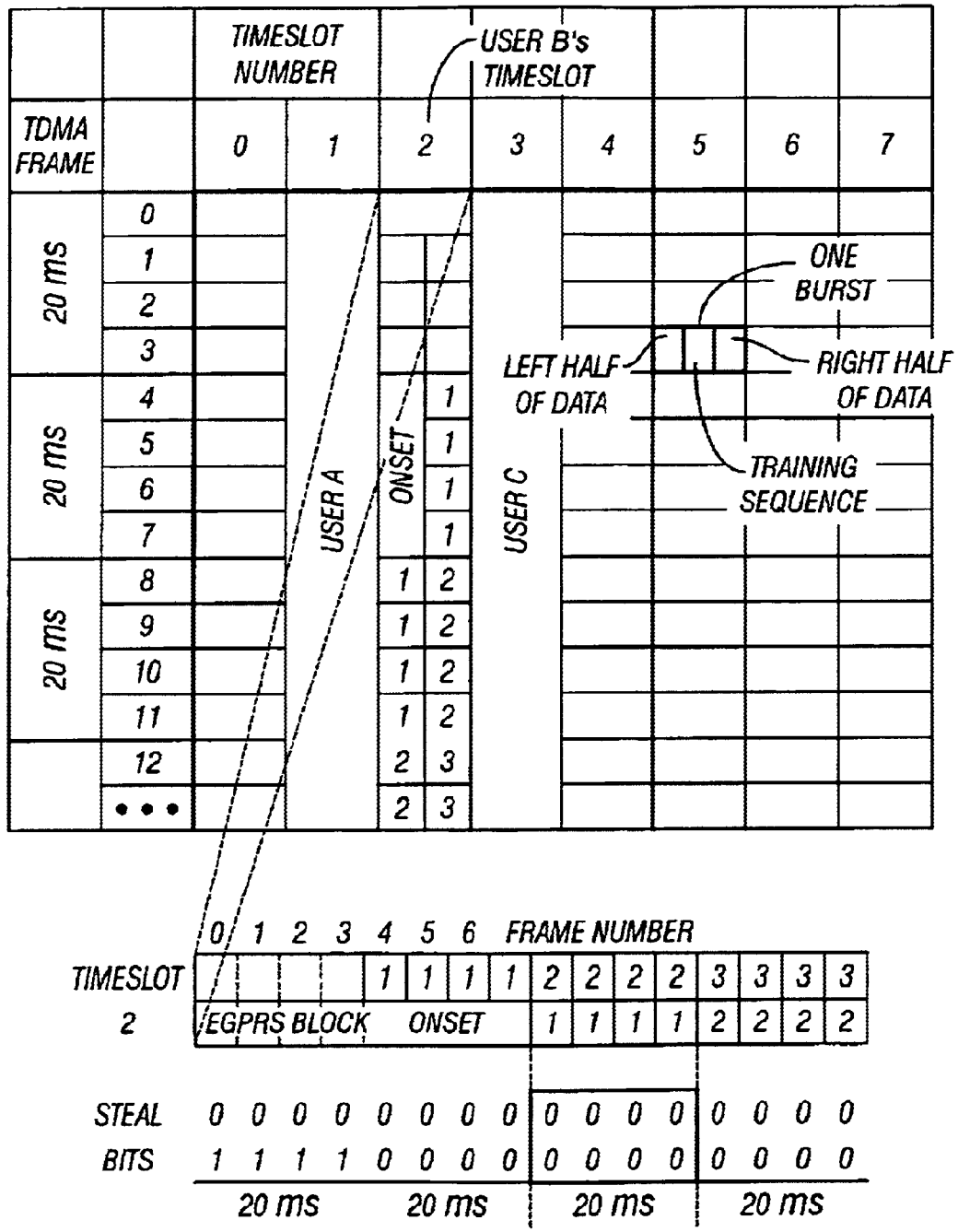
FIG. 3 is a TDMA signal diagram of transmitted signals handled by a receiver according to an embodiment of the present invention.

Referring to FIG. 3, a receiver 100 within telecommunications system 2, such as a receiver within mobile station 10(1) of FIG. 2, may include decode circuitry 101 (FIG. 3) that is capable of decoding information in any of a plurality of formats. For GMSK modulation, for example, decode circuitry 101 is capable of decoding information formatted in speech, MCS 1–4, FACCH and PACCH formats. Receiver 100 may further include input circuitry 102 which receives signals transmitted over the air interface. Receiver 100 may further include control circuitry 103 which receives as an input transmitted signals received by input circuitry 102, and controls decode circuitry 101 for decoding the transmitted signals based upon the particular format of the received signal. It is understood that receiver 100 may include other components and/or circuits for performing other receiver-related functions, such as a noise generator 104 for generating a predetermined level of comfort noise for the mobile station 10(1) during speech silence periods.

In general terms, receiver 100 and/or control circuitry 103 is configurable into a plurality of modes or states based upon the information transmitted to receiver 100. Control circuitry 103 enters a first or SPEECH mode for receiving and decoding speech and FACCH signals. In addition, control circuitry 103 enters a second or NO_SPEECH mode for suitably decoding transmitted signals during speech silence periods and generating comfort-level noise. Control circuitry 103 enters a third or SPEECH_POSSIBLE mode during a transition between receiving transmitted information during a speech silence period and receiving transmitted speech/FACCH information. Decode circuit 101 decodes transmitted frames of information dependent upon the present mode of the control circuitry 103.

Control circuitry 103 transitions between the three modes based upon AMR identification markers defined for an AMR speech codec and/or the physical layer header transmitted with each frame of information. Control circuitry 103 also interprets the value of the physical layer header associated with the transmitted information based upon the present mode of the control circuitry 103. Control circuitry 103 detects format transitions of transmitted signals using the AMR identification markers and configures decode circuit 101 accordingly. If receiver 100 fails to detect a format transition using the AMR identification markers, the receiver 100 can use the physical layer headers to recover the correct state, as explained in greater detail below.

The operation of receiver 100 will be described with reference to FIGS. 3 and 4. Initially, it is noted for exemplary and clarity purposes that speech and FACCH is transmitted to receiver 100 in diagonally interleaved frames over eight half bursts. In addition, an EGPRS block containing best effort data (such as PACCH or MCS 1–9) is transmitted over four bursts as block interleaved signals. FIG. 3 illustrates an exemplary signal table or diagram. A user assigned to time slot number two, such as the user associated with the device having receiver 100, receives the frames in the second time slot and associated physical layer header (i.e., so called stealing bits). The signal table illustrates the user associated with receiver 100 receiving an EGPRS block during the first four frames, a first diagonal interleaved speech frame beginning in frame 4 and ending in frame 11, and a second diagonally interleaved speech frame beginning in frame 8 and ending in frame 15.

Figures 4, 5:
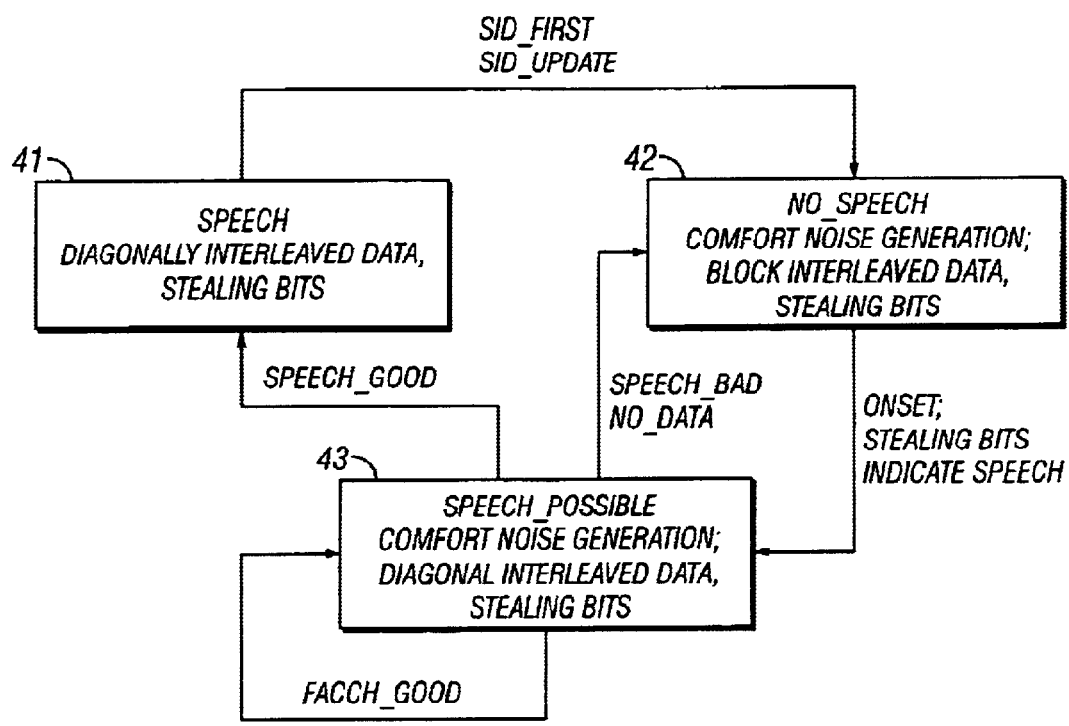
FIG. 4 is a state diagram illustrating the operation of a receiver of FIG. 2.
FIG. 5 is an exemplary state table for the physical layer header handled by the receiver according to an embodiment of the present invention.

FIG. 4 illustrates a state/mode diagram for receiver 100 and particularly control circuitry 103. As explained above, control circuitry 103 is configurable into one of three modes or states. In the SPEECH mode 41, control circuitry 103 and decode circuit 101 decode transmitted speech or FACCH signals, which both are diagonal interleaved. The physical layer header/stealing bits of the transmitted signal indicate whether speech or FACCH decoding is necessary. If any of AMR identification markers SID_FIRST (indicating the beginning of a silent or DTX period) or SID_UPDATE are detected by receiver 100, receiver 100 enters and/or transitions to the NO_SPEECH mode 42.

In the NO_SPEECH mode 42, the transmitted information and physical layer header may be block interleaved so as to allow for modulation changes of best effort data without introducing interleaving loss. In this mode, control circuitry 103 initiates noise generator 104 to generate comfort noise during the present DTX period. The physical layer header/stealing bits indicate whether the associated transmitted frame is speech, best effort data or PACCH information. In the event that the physical layer header indicates the transmitted signal is best effort data or PACCH information, control circuitry 103 configures decoder circuit 101 to suitably decode the transmitted signal. If the physical layer header indicates that the transmitted frame contains speech, control circuitry 103 enters SPEECH_POSSIBLE mode 43. Normally, control circuitry 103 may enter SPEECH_POSSIBLE mode 43 from NO_SPEECH mode 42 upon AMR reception of identification marker ONSET as shown in FIG. 4. The identification marker ONSET may be followed by either speech or FACCH information.

When receiver 100 enters SPEECH_POSSIBLE mode 43, control circuitry 103 allows the noise generator 104 to continue to generate comfort noise. Control circuitry 103 configures decode circuit 101 to decode either speech or FACCH information, based upon the value of the corresponding physical layer header. If the received physical layer header indicates that a transmitted frame is FACCH which is successfully decoded by decode circuit 101, control circuitry 103 remains in SPEECH_POSSIBLE mode 43 in case speech or another FACCH frame follows. If the following transmitted frame is not speech or FACCH information, a SID_FIRST signal is generated and control circuitry 103 returns to NO_SPEECH mode 42.

On the other hand, in the event control circuitry 103 receives a transmitted speech frame as indicated by the corresponding physical layer header, decode circuit 101 decodes the transmitted frame as speech. If the decoded speech is decoded without decoding errors, such as without CRC errors, control circuitry 103 enters SPEECH mode 41 and deactivates noise generator 104 accordingly. If the decoded speech frame is decoded with severe errors, however, AMR label SPEECH_BAD is indicated to receiver 100, control circuitry 103 returns to the NO_SPEECH mode 42 and noise generator 104 is uninterruptedly activated.

It is noted that the value of the physical layer header that causes control circuitry 103 to transition from NO_SPEECH mode 42 to SPEECH_POSSIBLE mode 43 may be the block interleaved code word value corresponding to two consecutive diagonal interleaved speech frames such that the receiver interprets the frames as speech regardless of mode/state. For instance, the physical layer header may contain all zeros. If two consecutive diagonal interleaved headers are received, then, the corresponding block interleaved header would also be the all zeros header so as to indicate to receiver 100 that a transition to receiving transmitted speech frames may have been missed and/or not received.

It is further noted that by transitioning from NO_SPEECH mode 42 to SPEECH_POSSIBLE mode 43 and ultimately to SPEECH mode 41 without having received an AMR identification marker indicating the start of transmitted speech frames and/or a talk spurt, such as marker ONSET, control circuitry 103 nonetheless enters the correct state (SPEECH mode 41). In the present case, the first transmitted speech frame may be lost. However, if the second transmitted speech frame has substantially acceptable quality, the corresponding physical layer header will indicate to control circuitry 103 (while in the NO_SPEECH mode 42) that such second transmitted speech frame contains speech information, resulting in control circuitry 103 entering the SPEECH_POSSIBLE mode 43 and the second speech frame being properly decoded. Upon a successful decoding of the second speech frame, control circuitry 103 enters SPEECH mode 41.

As explained above, receiver 100 utilizes the physical layer header when transmission is in a speech silence period in part to detect the reception of speech frames and to decode transmitted frames for speech (i.e., enter SPEECH mode 41) accordingly. It is understood that the value of the physical layer header indicating the occurrence of transmitted speech frames is the same when control circuitry 103 is in the SPEECH mode 41 as when control circuitry 103 is in the NO_SPEECH mode 42. An exemplary state table for the physical layer header for a receiver 100 operating in a GMSK network is illustrated in FIG. 6. As can be seen, the state table physical layer header is referred to as DSBx when control circuitry 103 is in the SPEECH mode 41 (thereby indicating diagonal interleaved stealing bits) and BSBx when control circuitry 103 is in the NO_SPEECH mode 42 (thereby indicating block interleaved stealing bits). In this way, if the AMR markers indicating the start of a talk spurt is missed or otherwise not received, then the physical layer headers of two diagonally interleaved speech frames are interpreted as block interleaved frames and nonetheless indicated speech. This allows receiver 100 to enter SPEECH_POSSIBLE mode 403 from NO_SPEECH mode 42 in the event AMR markers indicating the start of a talk spurt are missed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for communicating in a communications system, comprising,
   a receiver configurable in a plurality of states, wherein in each state the physical layer headers associated with received frames of information are usable to determine the format in which the received frames of information are to be decoded and are interpreted differently relative to the interpretation of the physical layer headers in another state, wherein the plurality of states includes:
   a speech state in which the physical layer headers indicate to the receiver to utilize speech decoding or fast associated control channel (FACCH) decoding for the information in the received frames;
   a comfort noise state in which the receiver generates comfort noise, and best-effort data is interleaved with the physical layer headers, wherein the physical layer headers indicate that speech, data, or packet associated control channel (PACCH) information is included in the received frames; and
   a speech possible state in which the receiver generates comfort noise, the physical layer headers indicate that speech or FACCH information is included in the received frames, and the receiver attempts to decode either speech or FACCH information, as indicated by the physical layer headers.

2. The device of claim 1, wherein:
   the receiver is configurable in the speech state when received frames of information include at least one of speech and FACCH information, in the comfort noise state during a speech silence period, and in the speech possible state when the received frames of information transition from the speech silence period to a talk spurt period.

3. The device of claim 1, wherein:
   received frames of speech information are diagonal interleaved;
   received frames of best-effort data are block interleaved; and
   physical layer headers of a first set of successively received frames of speech information indicate that the first set of received frames contain speech information when the physical headers of the first set of received frames are decoded as block interleaved frames.

4. The device of claim 2, wherein:
   the receiver enters the speech possible state from the comfort noise state when the physical layer header associated with the received frames of information indicate that the associated received frames of information include speech information.

5. The device of claim 2, wherein:
   the receiver enters the speech possible state from the comfort noise state when adaptive multi-rate (AMR) identification markers associated with the received frames of information indicate commencement of receiving speech information.

6. The device of claim 2, wherein:
   the receiver enters the speech state from the speech possible state when a physical layer header associated with a received frame of information indicates that the associated received frame of information includes speech and the associated received frame of information is successfully decoded as speech information.

7. The device of claim 2, wherein:
   the receiver enters the comfort noise state from the speech possible state when a physical layer header associated with a received frame of information indicates that the associated received frame of information includes speech and the associated received frame of information is unsuccessfully decoded as speech information.

8. The device of claim 2, wherein:
   the receiver enters the comfort noise state from the speech possible state when the receiver receives and decodes one or more received first frames having FACCH information and one or more received second frames immediately following the one or more received first frames do not include FACCH information and speech information.

9. The device of claim 1, wherein:
   the receiver is configurable in a speech state when received frames of information includes at least one of speech and FACCH information and in a comfort noise state during speech silence periods; and
   the receiver transitions between the speech state and the comfort noise state even in an absence of identification markers indicating the type of information in the received frames of information.

10. The device of claim 9, wherein:

the receiver is configurable in the speech possible state when the received frames of information transition from a speech silence period to a talk spurt period; and the receiver transitions between the speech state, the comfort noise state and the speech possible state even in an absence of identification markers indicating the type of information in the received frames of information.

11. The device of claim 1, wherein the receiver comprises:

an input circuit for receiving the received frames of information;

a decoding circuit for decoding the received frames of information into any of a plurality of signal formats; and a control circuit for controlling the decoding circuit based upon the values of the physical layer headers associated with the received frames of information.

12. The device of claim 1, wherein:

the receiver is configurable in the speech state when received frames of information include speech related information and in the comfort noise state during speech silence periods; and the receiver transitions between the speech state and the comfort noise state based upon adaptive multi-rate (AMR) identification markers associated with the received frames of information.

13. A communications device for participating in a communication of information, comprising:

a receiver, comprising:

an input circuit for receiving transmitted frames of information;

a decoding circuit for decoding the received frames of information into any of a plurality of signal formats; and a control circuit configurable into a plurality of states based in part upon adaptive multi-rate (AMR) identification markers of the received frames of information, the decoding circuit decoding the received frames of information based upon the state of the control circuit;

wherein the plurality of states includes:

a speech state in which physical layer headers of the received frames of information indicate to the receiver to utilize speech decoding or fast associated control channel (FACCH) decoding for the information in the received frames;

a comfort noise state in which the receiver generates comfort noise, and best-effort data is interleaved with the physical layer headers, wherein the physical layer headers indicate that speech, data, or packet associated control channel (PACCH) information is included in the received frames; and a speech possible state in which the receiver generates comfort noise, the physical layer headers indicate that speech or FACCH information is included in the received frames, and the receiver attempts to decode either speech or FACCH information, as indicated by the physical layer headers.

14. The communications device of claim 13, wherein:

the control circuit transitions between states even if a transmitted AMR identification marker is not received by the receiver.

15. The communications device of claim 13, wherein:

the receiver is configurable in the speech state when received frames of information include at least one of speech and FACCH information and in the comfort noise state during speech silence periods;

received frames of information are decoded as diagonal interleaved signals when in the speech state and as block interleaved signals when in the comfort noise state; and physical layer headers associated with the received frames of information indicating speech are the same when decoded as diagonal interleaved signals and as block interleaved signals.

* * * * *

UNITED STATES PATENT AND TRADEMARK OFFICE
CERTIFICATE OF CORRECTION

| | |
|---|---|
| PATENT NO. | : 6,907,030 B1 |
| APPLICATION NO. | : 09/686734 |
| DATED | : June 14, 2005 |
| INVENTOR(S) | : David Bladsjö et al. |

Page 1 of 1

It is certified that error appears in the above-identified patent and that said Letters Patent is hereby corrected as shown below:

In Column 5, Line 48, after "network" insert -- 8 --.

In Column 6, Line 49, after "station" insert -- 10 --.

In Column 6, Line 65, after "EDGE" delete "451".

In Column 9, Line 50, in Claim 1, after "comprising" delete "," and insert -- : --, therefor.

Signed and Sealed this

Thirteenth Day of November, 2007

JON W. DUDAS
*Director of the United States Patent and Trademark Office*